United States Patent
Mizuguchi et al.

(10) Patent No.: US 8,683,656 B2
(45) Date of Patent: Apr. 1, 2014

(54) HANDLE DEVICE OF WORK MACHINE (75) Inventors: Hiroshi Mizuguchi, Wako (JP); Tadashi Yamashita, Wako (JP); Taiyo Onodera, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 13/166,393

(22) Filed: Jun. 22, 2011

(65) Prior Publication Data
US 2011/0308040 A1 Dec. 22, 2011

(30) Foreign Application Priority Data
Jun. 22, 2010 (JP) .................. 2010-141543

(51) Int. Cl.
*B25G 1/10* (2006.01)

(52) U.S. Cl.
USPC ........................................... 16/422

(58) Field of Classification Search
USPC ........... 16/422, 436, 438, 444–445, 900, 429, 16/DIG. 25, 408, 110.1; 280/47.371, 280/47.315, 655, 655.1; 182/16; 248/140–142, 221.11, 222.11–222.13, 248/408, 409, 681; 294/58, 178, 85, 82.24, 294/82.31, 167; 81/177.2, 177.7; 220/696, 220/762, 765–766; 172/350; 74/145, 536, 74/551.7
See application file for complete search history.

(56) References Cited

U.S. PATENT DOCUMENTS

| | | | |
|---|---|---|---|
| 3,167,346 A | 1/1965 | Miller | |
| 4,708,357 A | 11/1987 | Soderbaum | |
| 5,590,440 A * | 1/1997 | Pelt et al. | 16/429 |
| 6,742,995 B1 * | 6/2004 | Wood et al. | 417/234 |
| 7,496,990 B2 | 3/2009 | Qiao | |
| 7,597,340 B2 | 10/2009 | Hirose et al. | |
| 7,849,564 B2 * | 12/2010 | Miller | 16/436 |
| 8,113,315 B2 | 2/2012 | Farley et al. | |
| 2003/0222428 A1 | 12/2003 | Shieh | |
| 2003/0222429 A1 | 12/2003 | Shieh | |
| 2007/0163566 A1 * | 7/2007 | Johnson et al. | 125/13.01 |
| 2009/0255758 A1 | 10/2009 | Farley et al. | |
| 2010/0072717 A1 | 3/2010 | Liska | |
| 2010/0132163 A1 * | 6/2010 | Hasei et al. | 16/421 |
| 2012/0042477 A1 | 2/2012 | Junk et al. | |

FOREIGN PATENT DOCUMENTS

| | | |
|---|---|---|
| EP | 2138686 A1 | 12/2009 |
| GB | 1322771 A | 7/1973 |
| JP | 2007-115457 A | 5/2007 |
| JP | 4226404 B2 | 2/2009 |
| JP | 2010-007577 A | 1/2010 |

OTHER PUBLICATIONS

European Office Action dated Oct. 28, 2011, issued in corresponding European Patent Application No. 11170852.5.

* cited by examiner

*Primary Examiner* — Victor Batson
*Assistant Examiner* — Matthew Sullivan
(74) *Attorney, Agent, or Firm* — Westerman, Hattori, Daniels & Adrian, LLP (57) ABSTRACT

A work machine handle device includes a handle foldable relative to a frame. The frame has a handle support part about which the handle turns. The handle intersects the handle support part. Left and right attachment parts, which are portions where the handle intersects the handle support part, are supported by a handle turning mechanism with suitable pressure.

4 Claims, 11 Drawing Sheets

HANDLE DEVICE OF WORK MACHINE

FIELD OF THE INVENTION

The present invention relates to a handle device of a work machine, such as a power generator and a pump, having a foldable handle provided to a chassis frame.

BACKGROUND OF THE INVENTION

Japanese Patent No. 4226404 (JP 4226404 B) discloses a work machine comprising a handle device provided to a steel chassis frame, wherein the handle folds up during transportation or movement. The handle device has a handle bracket fastened to a plate-shaped bracket provided to the chassis frame, a supporting base plate held by a bolt passed through a disc spring and fastened to the handle bracket so as to not turn, and a handle held by the bolt passed through the disc spring and fitted with the supporting base plate so as to turn. A manual locking mechanism engages with the handle bracket when the handle is in its use position.

Japanese Patent Application Laid-Open Publication No. 2010-7577 (JP 2010-7577 A) discloses a handle device in which a towing handle of a power generator is folded up with a positioning structure.

In this positioning structure, when the towing handle is turned downward, a stopper near the towing handle fulcrum comes in contact with a regulating part of the case of the power generator, and the towing handle therefore stops when accommodated in the case. When the towing handle is pulled out by turning to a transportation position, the stopper reverses and stops at another regulating part provided to the 180° position. The stopper then passes by an elastically deformable convex holding part; therefore, the transportation position is thereafter maintained by the holding part.

However, with the handle devices disclosed in JP 4226404 B) and JP 2010-7577 A, the structure of the handle device is complicated, a large number of components are used, and there is scope for improvement.

SUMMARY OF THE INVENTION

It is therefore an object of the present invention to provide a handle device for a work machine, which has a simple structure for folding up the handle.

According to an aspect of the present invention, there is provided a handle device of a work machine, which comprises: a frame for accommodating a work device, the frame having a handle support part which intersects the handle, formed with a given radius, and serves as a turning fulcrum of the handle; a transportation/movement handle attached in a foldable manner to the frame, extending outwardly of the frame, and having left and right grip parts at distal ends thereof; and a handle turning mechanism for supporting left and right attachment parts which are portions where the handle intersects the handle support part, wherein the turning mechanism comprises: a pair of shaft-clasping members for holding the handle support part in a sandwiching manner; and pressure-coupling members for pressing the shaft-clasping members towards the handle support part.

In this arrangement, since the fulcrum is the frame when the handle is folded up, there is no need to make and attach a separate shaft (including a bolt or a small screw) as the fulcrum when the handle is folded up, and the structure is simpler.

Furthermore, since a frame that is strong by design is the fulcrum, sufficient strength can be ensured in the fulcrum portion.

Furthermore, the handle, which can afterward be folded up, can be attached by the handle turning mechanism to the frame which uses existing pipes.

It is preferred that the pair of shaft-clasping members be comprised of sliding members made of a resin and slidable over an external peripheral surface of the handle support part; and rubber members held between the sliding members and the pressure-coupling members. Therefore, appropriate resistance against the turning of the handle is created by the rubber members, and the handle can be turned only when necessary. Furthermore, the handle does not move when the handle is in the folded up state. For example, the handle is not shaken even when the automotive vehicle in which it is carried shakes.

In a desired form, the handle has a handle engaging/disengaging part which continues from the left and right attachment parts of the handle, extends inwardly of the frame, and is provided oppositely from the grip parts. As a result, the handle engaging/disengaging part can be brought into contact with the frame by a turning operation to thereby place the handle in a substantially horizontal use position. In other words, there is no need to make a separate member equivalent to the handle engaging/disengaging part and dispose the member inward in the frame from the attachment parts, and this has the effect of simplifying the structure.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
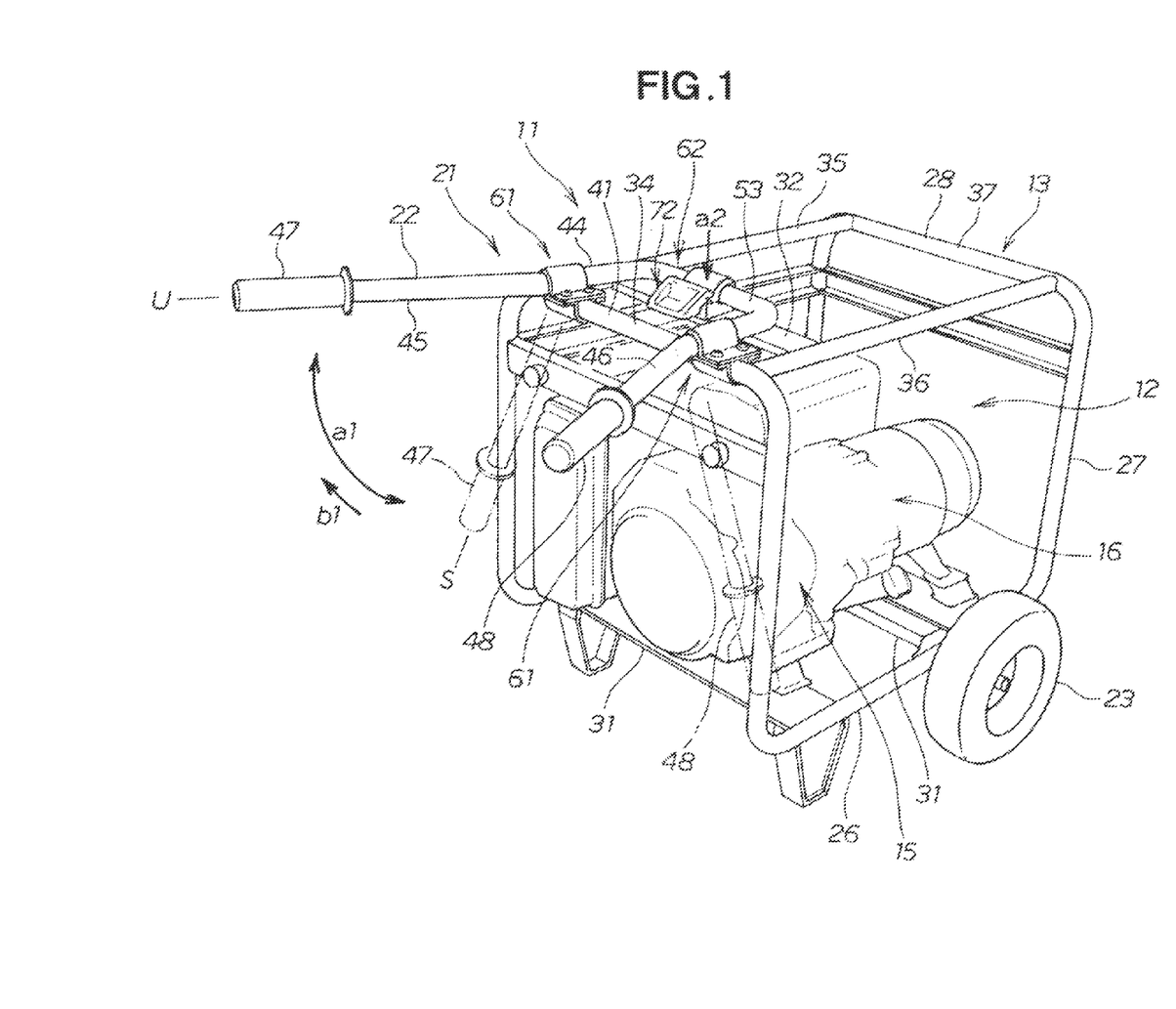
FIG. 1 is a perspective view of a work machine according to an embodiment of the present invention.

In the present embodiment, a power generator is presented as an example of a work machine 11 as shown in FIG. 1, but the work machine can also be applied as a pump device dealing with water or another fluid.

The work machine 11 comprises a work device 12 mounted on a frame 13, as shown in FIG. 1. This work device 12 includes a drive device (an engine) 15 and a power generation part 16. A handle 22 held on a handle device 21 can be folded up.

Figure 2:
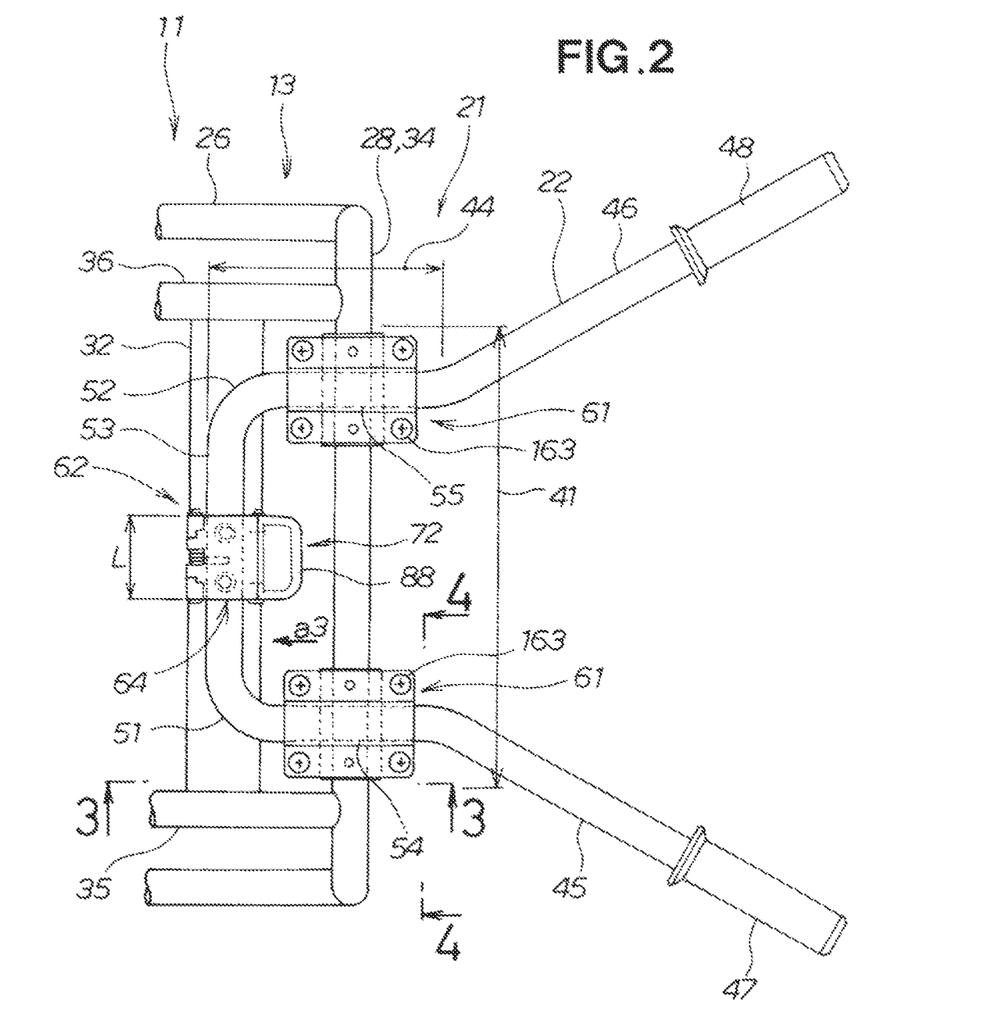
FIG. 2 is a plan view showing a handle device of FIG. 1.

The handle device 21 is attached to the frame 13 so that the handle 22 can be folded up in the direction of arrow a1 as shown in FIGS. 1 and 2. The reference symbol U indicates the use position of the handle 22, and the reference symbol S indicates the folded position of the handle 22. When the handle 22 is in the use position U, an operator moves the work machine 11 by manually grasping the handle 22 and pushing the machine using the wheels 23. When the work machine is loaded onto an automotive vehicle, two operators lift the machine by taking hold of the handle 22 and the frame 13.

The frame 13 is formed into a substantial square and is composed of a bottom frame part 26, four vertical frame parts 27 standing upright from the bottom frame part 26, and a top frame part 28 spanning as a continuation between the vertical frame parts 27. In other words, the frame 13 includes members, e.g., bottom cross base plates 31 and a top cross frame part 32 attached to a pipe frame.

The wheels 23 and the cross base plates 31, 31 are attached to the bottom frame part 26. The engine 15 and the power generator 16 are carried on the cross base plates 31, 31.

The top frame part 28 is composed of a first cross frame part 34 to which the handle 22 is attached, first and second side frame parts 35, 36 continuing from the first cross frame part 34, a second cross frame part 37, and the top cross frame part 32 which is in proximity to the first cross frame part 34. The handle 22 is attached to a handle support part 41 of the first cross frame part 34.

The handle 22 is created by bending a steel pipe. Specifically, a support part 44 supported on the frame 13 is plastically deformed into a U shape. A first arm part 45 is attached as a continuation to one end of this U-shaped support part 44. A second arm part 46 is attached to the other end. Seen in a plan view, the first and second arm parts 45, 46 extend rearward out to the exterior of the work machine 11 so as to widen outward. The first and second arm parts 45, 46 have a first grip part 47 and a second grip part 48 at their respective ends.

Due to a 90° plastic deformation of a first bent part 51 and a second bent part 52, the U-shaped support part 44 has a handle engaging/disengaging part (a stopper part) 53 extending in the vehicle width direction, and first and second attachment parts 54, 55 extending in parallel in the vehicle forward-backward direction.

The handle engaging/disengaging part 53 is engaged to and disengaged from a clamp mechanism 62 provided to the top cross frame part 32 when the handle 22 is turned to the use position U.

The first attachment part 54 and the second attachment part 55 are orthogonal to the first cross frame part 34 of the frame 13, and are attached so as to be capable of turning relative to the first cross frame part 34 (in the direction of arrow a1).

When the handle 22 is lifted up, causing the work machine 11 to be lifted up while the handle 22 is in the use position U, force is created in the handle engaging/disengaging part 53 as shown by arrow a2 and transmitted to the top cross frame part 32 of the work machine 11.

Next, the configuration of the handle device 21 of the work machine 11 according to the embodiment will be described based on FIGS. 1 through 5.

The handle device 21 has a structure in which a handle 22 for transportation and movement, which has a first grip part 47 and a second grip part 48 extending to the rear of the vehicle body at the distal ends, is attached in a foldable manner to the frame 13 on which a power generator or another work device 12 is carried.

Figure 3:
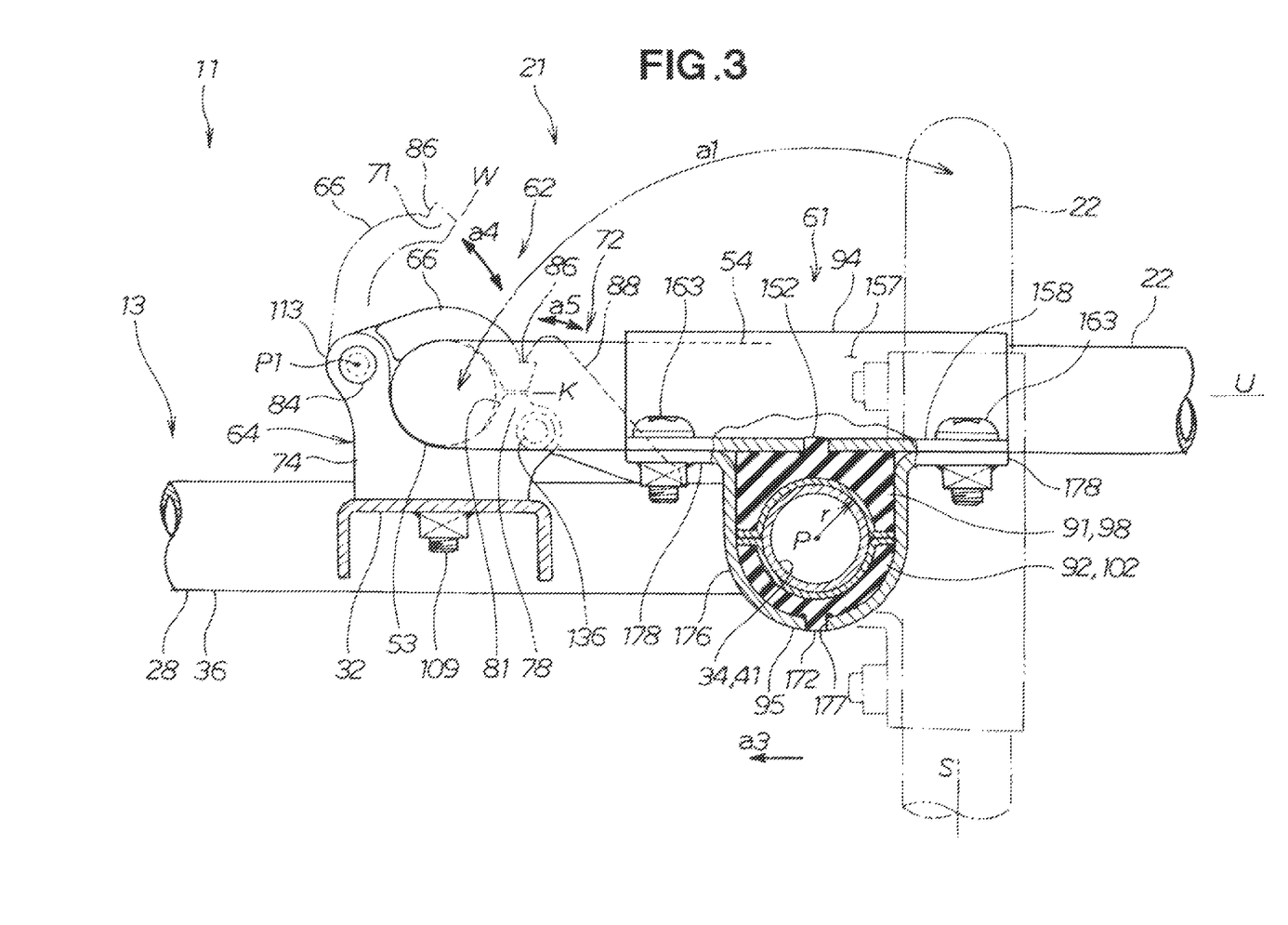
FIG. 3 is an enlarged cross-sectional view taken along line 3-3 of FIG. 2.

The handle support part 41, which intersects at least with the handle 22 of the frame 13, is formed with a desired radius r (FIG. 3). The handle 22 turns about a fulcrum P. The first attachment part 54 and the second attachment part 55, which are left and right attachment parts intersecting the handle 22, are supported by a handle turning mechanism 61.

Figure 4:
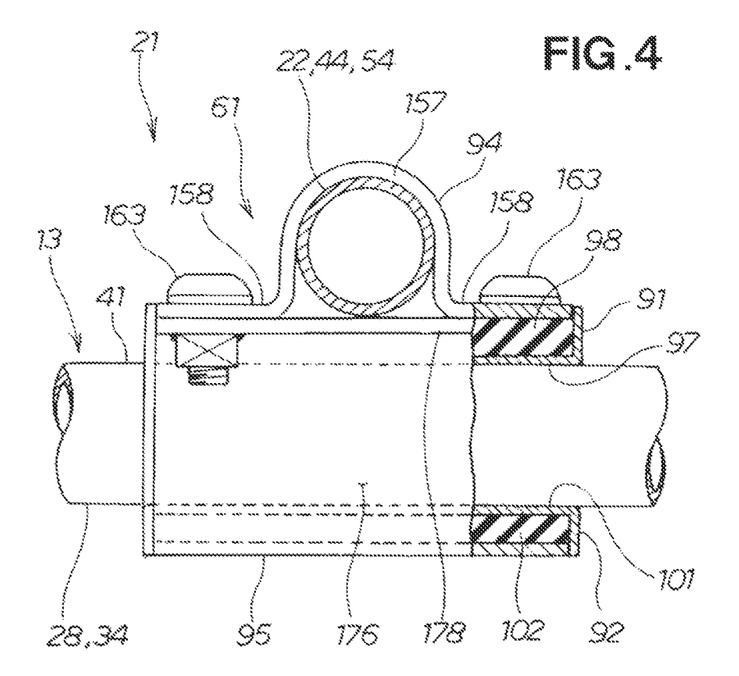
FIG. 4 is an enlarged cross-sectional view taken along line 4-4 of FIG. 2.
Figure 5:
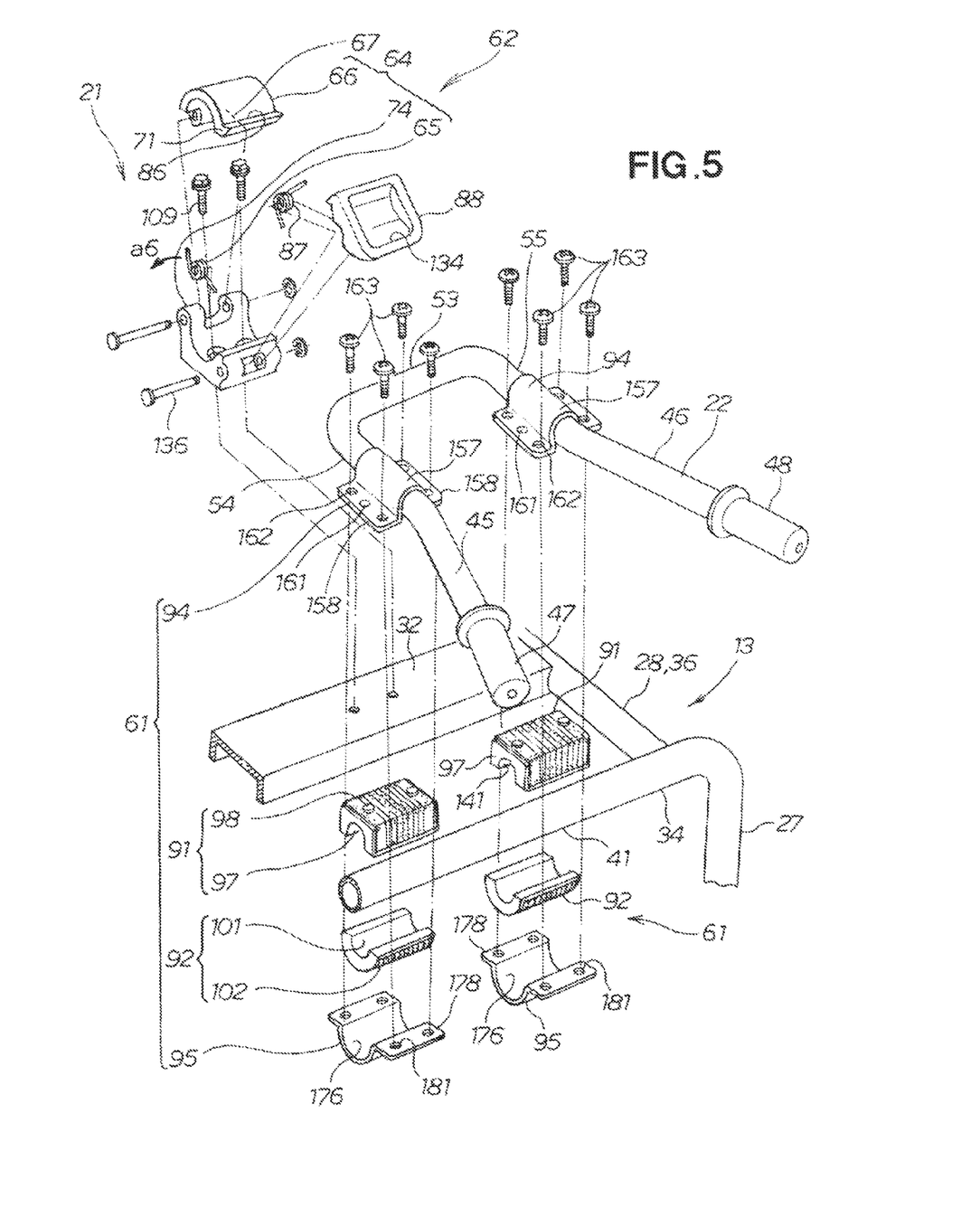
FIG. 5 is an exploded perspective view showing the handle device of FIG. 2.

The handle turning mechanism 61 has a first shaft-clasping member 91 and a second shaft-clasping member 92 as a pair of shaft-clasping members divided so as to sandwich the handle support part 41, and a first pressure-coupling member 94 and a second pressure-coupling member 95 as pressure-coupling members for respectively pressing the first shaft-clasping member 91 and the second shaft-clasping member 92 against the handle support part 41, as shown in FIGS. 3 through 5.

The first shaft-clasping member 91 is composed of a first sliding member 97 which is made of a resin and which slides over the external peripheral surface of the handle support part 41, and a rubber member 98 which is sandwiched between the first sliding member 97 and the first pressure-coupling member 94.

The second shaft-clasping member 92 is composed of a second sliding member 101 which is made of a resin and which slides over the external peripheral surface of the handle support part 41, and a rubber member 102 which is sandwiched between the second sliding member 101 and the second pressure-coupling member 95.

The handle device 21 has the handle engaging/disengaging part 53, which extends inward in the frame 13 (in the direction of arrow a3 in FIGS. 2 and 3) as an integral continuation of the first attachment part 54 and the second attachment part 55 that are the left and right attachment parts of the handle 22, and which is formed so as to be positioned in the side opposite the positions of the first grip part 47 and the second grip part 48. By turning the handle engaging/disengaging part 53 in the direction of arrow a1 toward the frame 13, the handle 22 is made substantially horizontal and the handle 22 is brought to the use position U. In other words, the handle engaging/disengaging part 53 is turned toward a fixed member 74 of the clamp mechanism 62 provided to the top cross frame part 32 of the frame 13.

When the clamp mechanism 62 is not provided, it is possible to bring the handle 22 to the use position U by bringing the handle engaging/disengaging part in contact with the top cross frame part 32. The height of the top cross frame part 32 must then be adjusted in order to make the handle 22 substantially horizontal.

Next, the handle turning mechanism 61 according to the present embodiment will be described.

The handle turning mechanism 61 is composed of the previously described first shaft-clasping member 91, the second shaft-clasping member 92, the first pressure-coupling member 94, and the second pressure-coupling member 95.

Figure 6A:
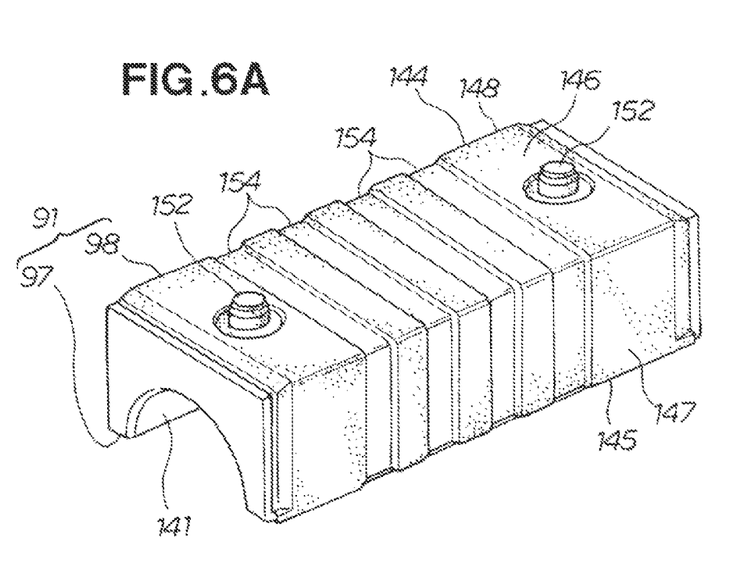
FIGS. 6A though 6C are schematic views showing part of the handle device, namely, FIG. 6A showing in perspective one shaft-clasping member, FIG. 6B showing in front elevation the shaft-clasping member, and FIG. 6C being a cross-sectional view taken along line c-c of FIG. 6B.
Figure 6B:
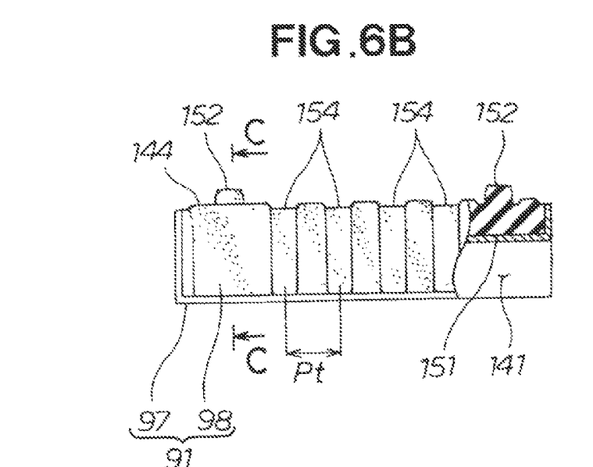
Figure 6C:
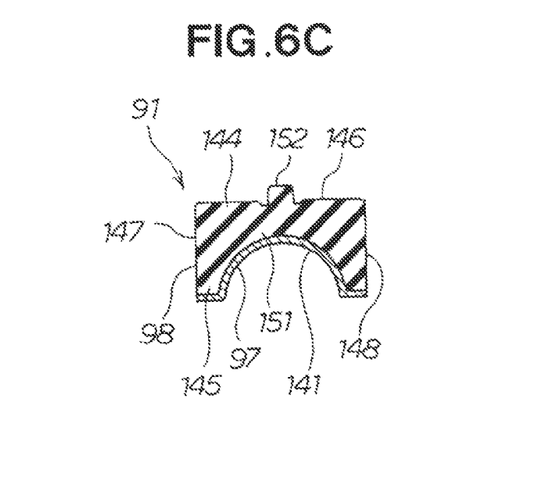

The first shaft-clasping member 91 is structured with the first rubber member 98 bonded to the first sliding member 97 as shown in FIGS. 6A through 6C.

The first sliding member 97 has a semicircular first pipe-fitting part 141 which fits over the handle support part 41 provided to the first cross frame part 34 of the frame 13 (FIG. 3). The first pipe-fitting part 141 has a radius slightly larger than the outside diameter r of the handle support part 41. The internal peripheral length of the first pipe-fitting part 141 is slightly shorter than 50% of the external peripheral length of the handle support part 41. In other words, the first shaft-clasping member 91 is formed so as to have a gap δ (see FIG. 9).

The first rubber member 98 has a first rubber main body 144, and the first rubber main body 144 has a first side surface 145 facing downward, a second side surface 146, a third side surface 147, and a fourth side surface 148. The third side surface 147 and the fourth side surface 148 may face in any direction.

A semicircular bonding concavity 151 which bonds to the first pipe-fitting part 141 is formed in the first side surface 145. Boss parts 152 are formed both in one end and the other end of the second side surface 146 facing the first side surface 145. A plurality of adjustment grooves 154 is formed at a predetermined pitch Pt in the second side surface 146, the third side surface 147, and the fourth side surface 148 between the two boss parts 152, 152. The second side surface 146 is supported by the first pressure-coupling member 94 as shown in FIG. 4.

The first pressure-coupling member 94 has a semicircular pipe-bonding part 157 formed so as to fit over the first attachment part 54 and the second attachment part 55 of the handle 22, as shown in FIGS. 2 through 5. The pipe-bonding part 157 is formed with a radius slightly larger than the outside diameter of the first attachment part 54 or the second attachment part 55.

Flange parts 158 are formed integrally along the longitudinal direction of the pipe-bonding part 157. Regulating holes 161 into which the boss parts 152 fit are formed in the centers of the flange parts 158. By having the boss parts 152 fitted into the regulating holes 161, the first rubber member 98 is positioned during assembly and is prevented from moving during use.

Fastening holes 162 are formed in the flange parts 158 in order to couple the first pressure-coupling member 94 with the second pressure-coupling member 95. The first and second pressure-coupling members 94, 95 are fastened by small screws 163 via the holes 162.

Figure 7A:
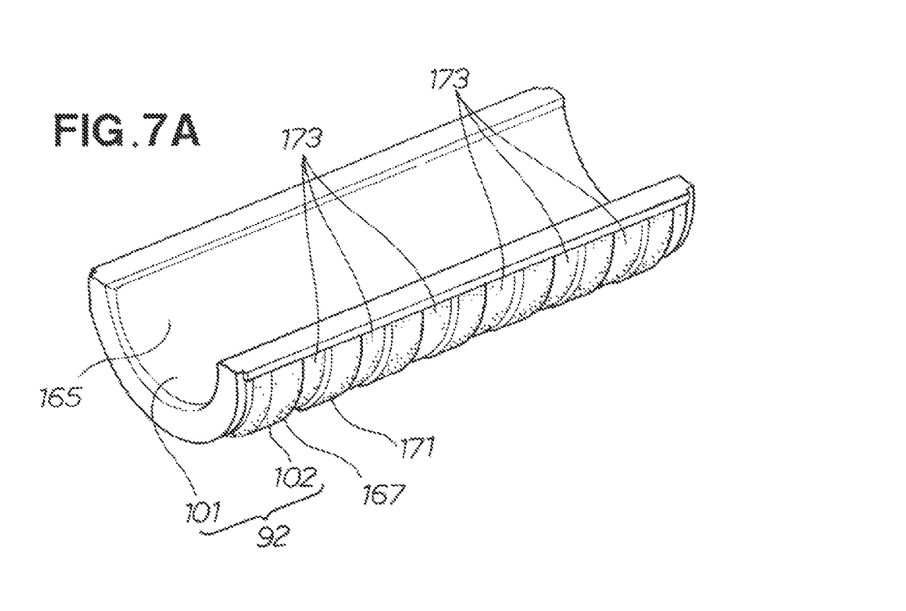
FIGS. 7A through 7C are schematic view showing another part of the handle device, namely, FIG. 7A showing in perspective another shaft-clasping member, FIG. 7B showing in front elevation the shaft-clasping member, and FIG. 7C being a cross-sectional view taken along line c-c of FIG. 7B.
Figure 7B:
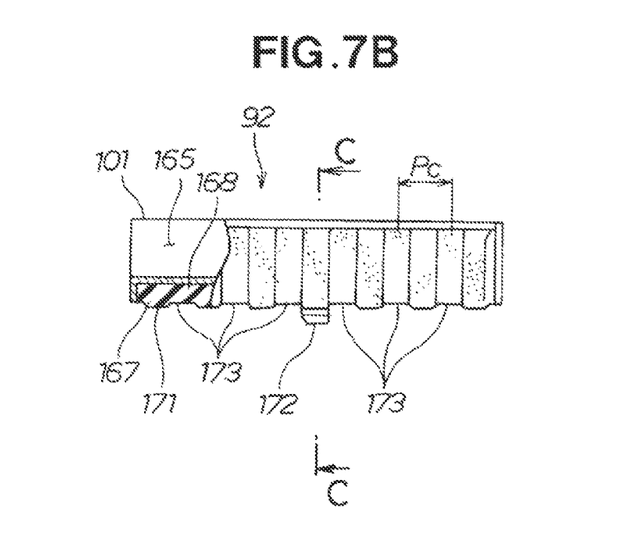
Figure 7C:
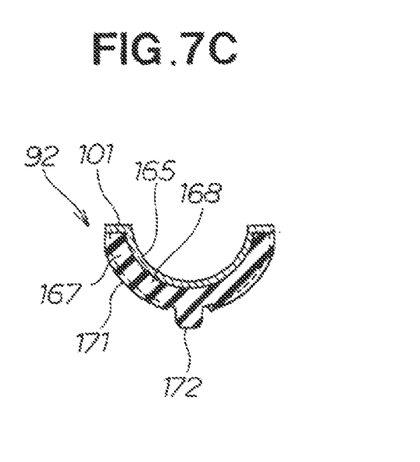

The second shaft-clasping member 92 is comprised of the second sliding member 101 and the second rubber member 102 bonded to the second sliding member 101 as shown in FIGS. 7A through 7C.

The second sliding member 101 has a semicircular second pipe-fitting part 165 formed so as to fit over the handle support part 41 provided to the first cross frame part 34 of the frame 13 (FIG. 2). The second pipe-fitting part 165 is formed so as to have a radius slightly larger than the outside diameter r of the handle support part 41. The internal peripheral length of the second pipe-fitting part 165 substantially coincides with the internal peripheral length of the first pipe-fitting part 141 (FIG. 6A). In other words, a gap δ (see FIG. 9) is formed between the second shaft-clasping member 92 and the first shaft-clasping member 91.

The second rubber member 102 has a semi-cylindrical second rubber main body 167. An internal periphery 168 of the second rubber main body 167 is formed having a radius whereby the internal periphery will be joined to the second pipe-fitting part 165. The second rubber main body 167 has a boss part 172 formed in the axial longitudinal center as well as the circumferential center of an external periphery 171 thereof.

A plurality of adjustment grooves 173 is formed at a predetermined pitch Pc in the external periphery 171 of the second rubber main body 167. The external periphery 171 is pressed by the second pressure-coupling member 95 (FIG. 4).

The second pressure-coupling member 95 has a U-shaped rubber backup part 176 formed so as to be in contact with the external periphery 171 of the second rubber main body 167, as shown in FIGS. 2 through 7C and FIG. 9. The U-shaped rubber backup part 176 runs along the third side surface 147 and the fourth side surface 148 of the first rubber member 98. Specifically, the rubber backup part 176 is supported in a state of being fitted with the first rubber member 98 and the second rubber member 102.

The center of the rubber backup part 176 has a regulating hole 177 (FIGS. 3 and 9) formed so as to allow the boss part 172 to fit in. By fitting the boss part 172 into the regulating hole 177, the second rubber member 102 is positioned and prevented from moving when the handle 22 is in use.

Flange parts 178 connected to the rubber backup part 176 are formed in parallel with the flange parts 158 of the first pressure-coupling member 94. A gap δ is formed between the flange parts 178 of the rubber backup part 176 and the flange parts 158 of the first pressure-coupling member 94. The gap δ is shown only in FIG. 9, but the gap δ is actually formed in the regions in FIGS. 3 and 8A where the gap δ is not shown. The gap δ varies depending on variation in the first pressure-coupling member 94, the second pressure-coupling member 95, and other components.

To couple the first pressure-coupling member 94 and the second pressure-coupling member 95, fastening holes 181 are formed in the flange parts 178 of the second pressure-coupling member 95 so as to correspond with the positions of the holes 162 formed in the first pressure-coupling member 94, as shown in FIG. 5.

Next, the state in which the handle 22 is locked by the clamp mechanism 62 will be described.

When the handle 22 is turned from the folded position S to the use position U as shown by arrow b1 in FIG. 1, the handle engaging/disengaging part (the stopper part) 53 of the handle 22 is automatically locked by the clamp mechanism 62.

Figure 8A:
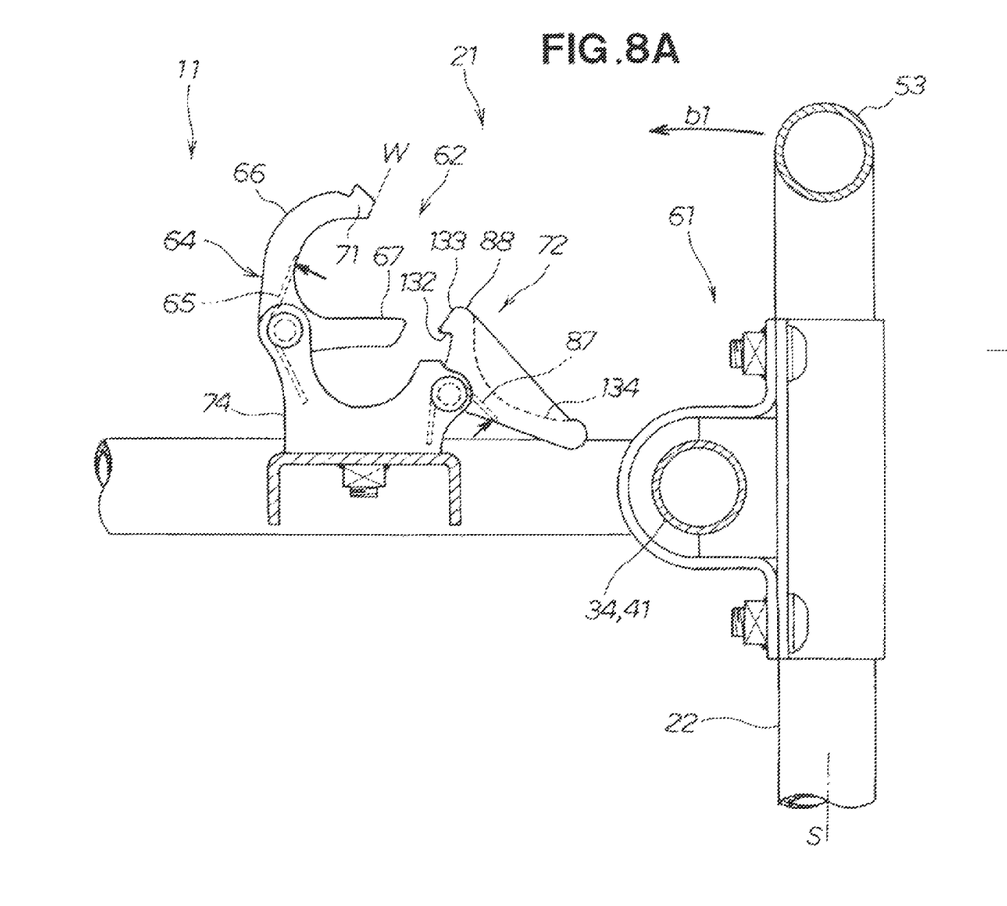
FIGS. 8A through 8C are schematic views showing a mode of movement of the handle of the handle device to a usage position.

Specifically, when the handle 22 has been folded up, the clamp mechanism 62 is opened by a spring 65 and kept in an open standby position W as shown in FIG. 8A. To bring the handle 22 to the use state, the handle 22 is turned in the direction of arrow b1.

Figure 8B:
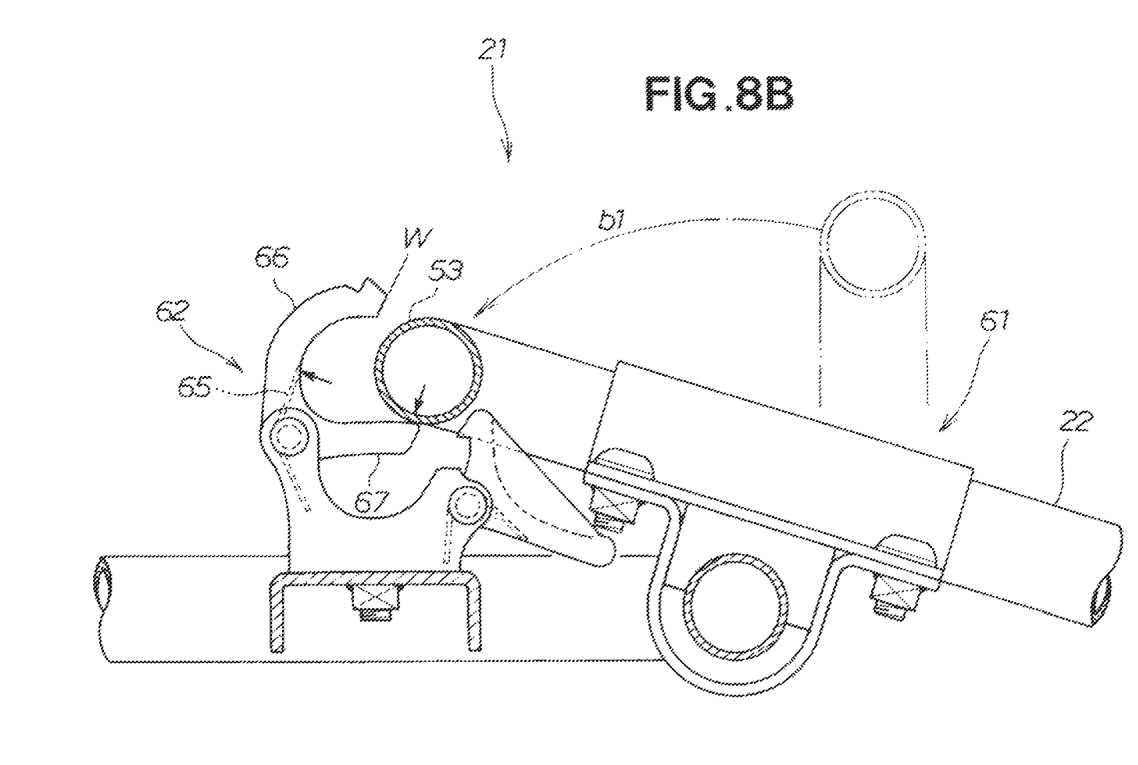

Next, the handle engaging/disengaging part 53 comes in contact with a actuating protuberance 67 of a turning member 66 as shown in FIG. 8B.

Figure 8C:
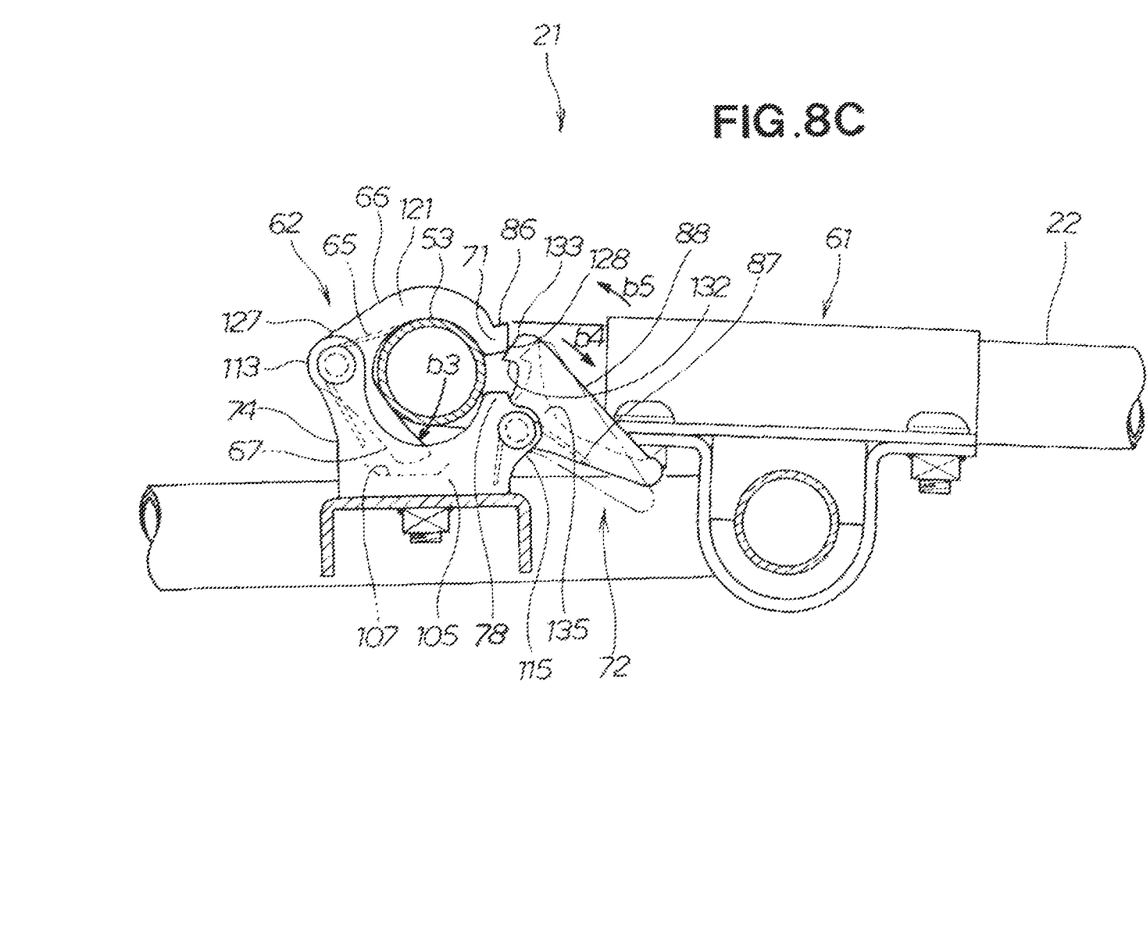

When the handle 22 is turned further, the handle engaging/disengaging part 53 pushes on the actuating protuberance 67, and the actuating protuberance 67 therefore begins to turn about a hinge (a first base hinge part 113 and a first hinge part 127) against the spring 65 as shown in FIG. 8C. At the same time, the turning member 66 also begins to turn in the direction shown by arrow b3.

When the handle 22 is then turned further, a push surface 128 connected to a distal end 71 of the turning member 66 pushes on a contact surface 133 of a movable pawl member 88, and the movable pawl member 88 therefore begins to turn about a hinge (a second base hinge part 115 and a second hinge part 135) in the direction shown by arrow b4 against a return spring 87, as shown by the double-dashed lines.

When the actuating protuberance 67 is then pushed by the handle engaging/disengaging part 53 and the actuating protuberance 67 and the turning member 66 (a turning main body 121) turns further, the actuating protuberance 67 moves into an accommodating part 107 of the fixed member 74. The distal end 71 of the turning member 66 then comes in contact with or draws near to a divided end (an open end 78) of the fixed member 74 (a base main body 105).

The turning member 66 reaches a closed position K as shown in FIG. 3 and the push surface 128 therefore separates from the contact surface 133. The movable pawl member 88 is turned (in the direction of arrow b5 in FIG. 8C) by the return spring 87, and a fixed pawl 86 of the turning member 66 engages with a movable pawl 132. Therefore, the handle engaging/disengaging part 53 can be automatically locked to the frame 13 in the use position U.

When the handle 22 is folded up and an operating part 134 (FIG. 8A) of the movable pawl member 88 of the clamp mechanism 62 is pushed against the return spring 87, the movable pawl member 88 turns as shown by the double-dashed line, and the movable pawl 132 separates from the fixed pawl 86.

When the handle 22 is then turned to the folded position S, the turning member 66 of the clamp mechanism 62 turns due to the return force of the spring 65 and opens as shown by the double-dashed lines of FIG. 8A (the open standby position W). Specifically, the turning member 66 of the clamp main body 64 turns in synchronization with the handle engaging/disengaging part 53, and is thereafter held in the open standby position W by the spring 65.

Figure 9:
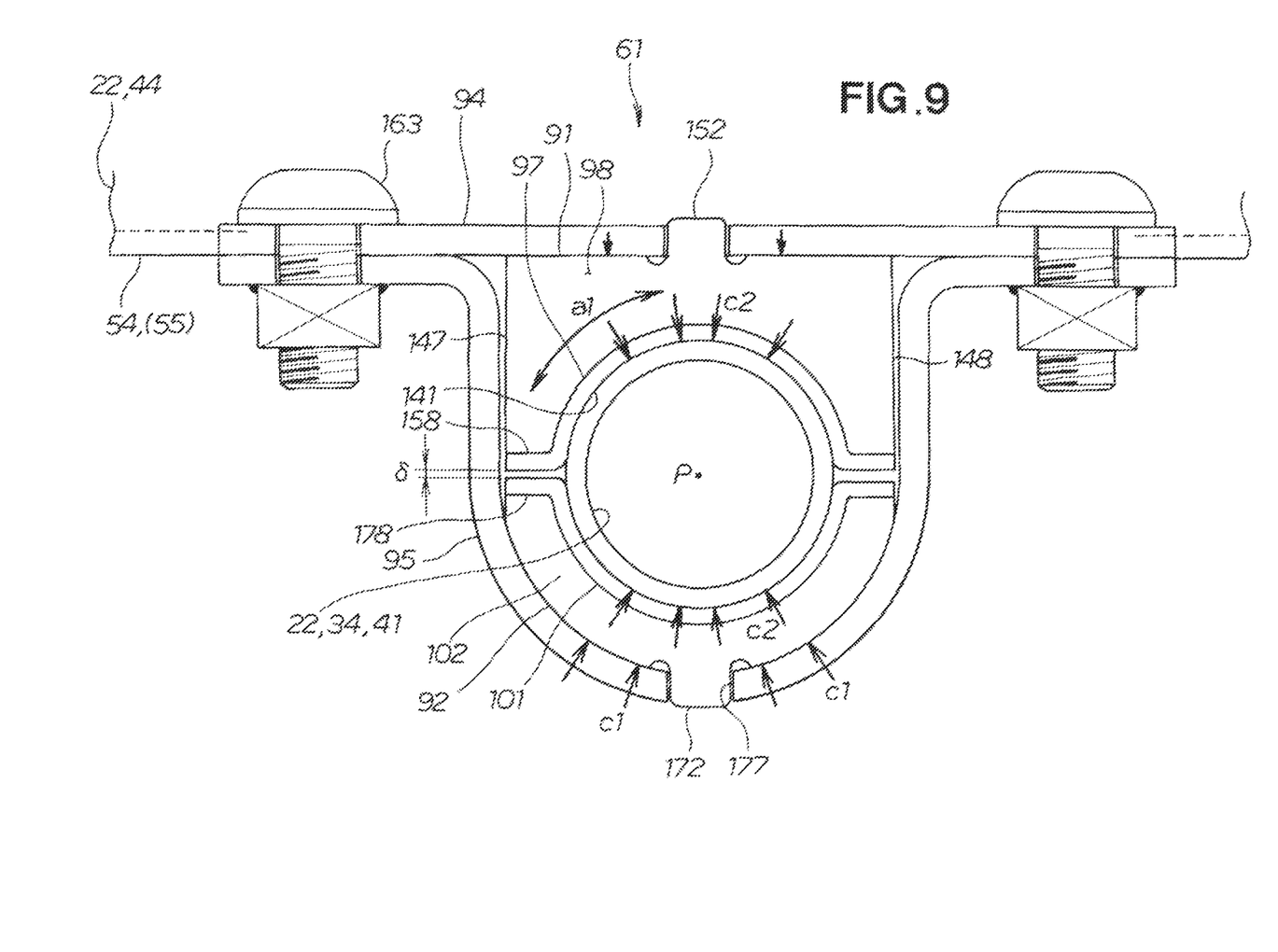
FIG. 9 is a view of a state in which resistance is imparted against the turning of the handle.

Next is a simple description, based on FIGS. 5 and 9, of an outline of assembling the handle turning mechanism 61.

First, the first pressure-coupling member 94 is integrally bonded to the first attachment part 54 of the handle 22 by being welded (fillet welding) at a welded part (including a bead). The first pressure-coupling member 94 is similarly bonded to the second attachment part 55.

Next, the first sliding member 97 of the first shaft-clasping member 91 is fitted to the first cross frame part 34 of the frame 13. After the boss parts 152 are fitted to the first pressure-coupling member 94 which is bonded to the first attachment part 54 and the second attachment part 55 of the handle 22, the first shaft-clasping member 91 may be fitted to the first cross frame part 34.

The second shaft-clasping member 92 is then fitted to the first cross frame part 34.

The boss part 172 of the second shaft-clasping member 92 is fitted in the regulating hole 177 of the second pressure-coupling member 95 in advance. The second shaft-clasping member 92 is fitted to the first cross frame part 34 and the second pressure-coupling member 95 is fastened by the small screws 163 to the first pressure-coupling member 94.

Fastening the small screws 163 with the desired amount of force (torque management) at this time creates a fastening force (axial force). Assembly of the handle turning mechanism 61 is then complete.

There now follows a description of the action of the handle device 21 of the work machine 11 according to the embodiment.

With the handle device 21, since the handle turning mechanism 61 is fastened to the frame 13, the handle 22 can be attached to an already existing frame and then folded up.

With the handle device 21, when the handle 22 is folded up or turned to the use position U, the frame 13 is used as a fulcrum P by the handle turning mechanism 61. Thus, there is no need to provide the frame with a shaft as a fulcrum P for folding up the handle 22, and the structure is simplified.

With the handle device 21, the handle 22 is held in any desired position (within a range from the use position U to the folded position 5) by the handle turning mechanism 61. In other words, when not needed, the handle 22 can be left alone.

Specifically, as shown in FIG. 9, the first cross frame part 34 slides smoothly against the first sliding member 97 and the second sliding member 101 (for reasons other than the friction coefficient, e.g. surface roughness and the like), and only a small force is needed for turning the first sliding member 97 and the second sliding member 101 and for turning the handle 22. However, turning of the handle 22 (in the direction of arrow a1) at times other than when required can be prevented because of the fastening force of the small screws 163; i.e., the fastening force whereby the first rubber member 98 and the second rubber member 102, under pressure from the second pressure-coupling member 95 in the direction of arrow c1, are fastened to the first and second pressure-coupling members 94, 95 over the first cross frame part 34 by an elastic force in the direction of arrow c2.

For example, even if the handle 22 is released in mid-turn, since the handle 22 does not turn of its own weight, the handle 22 can be held in the use position U or held in the folded position S. When the work machine 11 is loaded onto an automotive vehicle, the folded handle 22 can be prevented from shaking (in the direction of arrow a1).

Furthermore, since, as shown in FIGS. 6A and 7A, the adjustment grooves 154 are formed in the first rubber member 98 and the adjustment grooves 173 are formed in the second rubber member 102, variations in the shapes of the first pressure-coupling member 94 and the second pressure-coupling member 95 are accommodated, as are variations in the shapes of the first rubber member 98 and the second rubber member 102 as well as variations in the shape of the first cross frame part 34.

The handle device of the present invention is suitable for power generators, pumps, and other work machines.

Obviously, various minor changes and modifications of the present invention are possible in light of the above teaching. It is therefore to be understood that within the scope of the appended claims the invention may be practiced otherwise than as specifically described.

What is claimed is:

1. A handle device of a work machine, comprising:
a frame for accommodating a work device, the frame comprising a cross-frame part;
a handle attached in a foldable manner to the frame, having left and right grip parts at distal ends thereof, and having a U-shaped support part at a proximal end thereof, the U-shaped support part including a handle engaging/disengaging part; and
at least two handle turning mechanisms, each of which supports one of left and right attachment parts of the handle, the left and right attachment parts intersecting the cross frame part of the frame at a handle support part, such that the handle can turn about the handle support part of the cross-frame part as a turning fulcrum,
wherein each of the handle turning mechanisms comprises:
a pair of shaft-clasping members which hold the handle support part in a sandwiching manner; and
a pair of pressure-coupling members which press the shaft-clasping members towards the handle support part, and
wherein the frame comprises a bottom frame part, a plurality of vertical frame parts standing upright from the bottom frame part, and the cross-frame frame part spanning the vertical frame parts,
wherein said left and right attachment parts of the handle are disposed at positions between said distal ends and said proximal end of said handle,
wherein the handle engaging/disengaging part is spaced from the left and right attachment parts and is at a center of an end of said U-shaped support part, the U-shaped support part being opposite the left and right grip parts, and
wherein the handle engaging/disengaging part of the handle is disposed on an opposite side of the left and right attachment parts relative to the grip parts, in a proximal-distal direction of said handle.

2. The handle device of claim 1,
wherein the shaft-clasping members are comprised of sliding members made of a resin and slidable over an external peripheral surface of the handle support part, and rubber members held between the sliding members and the pressure-coupling members.

3. The handle device of claim 1, wherein the handle engaging/disengaging part is continuous with the left and right attachment parts of the handle, and wherein the handle engaging/disengaging part is rotatable about the turning fulcrum from a folded position such that the handle engaging/disengaging part is not in contact with the frame to a substantially horizontal use position such that the handle engaging/disengaging part is in contact with the frame.

4. The handle device of claim 1, wherein said frame further comprises a second cross-frame part inward of said cross-frame part, and wherein a clamp mechanism is disposed on said second cross-frame part.

* * * * *